United States Patent
Rose

[19]
[11] Patent Number: 6,134,768
[45] Date of Patent: *Oct. 24, 2000

[54] METHOD OF PRODUCING CONNECTION OF INSERT WITH TUBULAR PART BY FLANGING

[75] Inventor: Jochen Rose, Hemmingen, Germany

[73] Assignee: Robert Bosch GmbH, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/793,685

[22] PCT Filed: May 28, 1996

[86] PCT No.: PCT/DE96/00923

§ 371 Date: Feb. 14, 1997

§ 102(e) Date: Feb. 14, 1997

[87] PCT Pub. No.: WO97/04898

PCT Pub. Date: Feb. 13, 1997

[30] Foreign Application Priority Data

Jul. 25, 1995 [DE] Germany .......................... 195 27 125

[51] Int. Cl.⁷ ..................................................... B23P 11/02
[52] U.S. Cl. ........................... 29/446; 29/888.02; 29/511
[58] Field of Search ........................ 29/511, 516, 888.02, 29/509, 510, 446; 403/282

[56] References Cited

U.S. PATENT DOCUMENTS

| | | |
|---|---|---|
| 1,316,877 | 9/1919 | Clarkson . |
| 2,219,301 | 10/1940 | Erhard . |
| 2,910,983 | 11/1959 | Everett . |
| 3,442,491 | 5/1969 | Messerschmidt . |
| 3,556,567 | 1/1971 | O'Connor .............................. 29/511 X |
| 3,723,949 | 3/1973 | Wallo . |
| 3,940,843 | 3/1976 | Yeager ................................... 29/511 X |
| 4,020,538 | 5/1977 | Dennis et al. . |
| 4,103,937 | 8/1978 | Wakefield .............................. 29/511 X |
| 4,117,261 | 9/1978 | Blevins et al. ........................ 29/511 X |
| 4,257,155 | 3/1981 | Hunter ...................................... 29/511 |
| 4,269,438 | 5/1981 | Ridenour ............................... 29/511 X |
| 4,848,448 | 7/1989 | Kaarre ................................... 29/511 X |
| 4,888,862 | 12/1989 | Brandenstein et al. . |
| 4,932,114 | 6/1990 | Morse et al. .......................... 29/511 X |
| 5,136,772 | 8/1992 | Rupprecht et al. . |

FOREIGN PATENT DOCUMENTS

4013032A1  10/1991  Germany .

*Primary Examiner*—David P. Bryant
*Attorney, Agent, or Firm*—Michael J. Striker

[57] ABSTRACT

A method of producing a connection between an insert element with a tube-like part by means of flanging, the method has the steps of inserting an insert element from a direction of one front end into the tube-like part so that it comes to rest in a direction of a longitudinal axis of the tube-like part against a detent, fixing the insert element in place in the direction of the longitudinal axis between the detent and a flanged edge by flanging a projected edge of the tube-like part radially inwards in relation to the longitudinal axis, providing in the tube-like part an area which is enlarged in diameter over at least a part of a circumference of the tube-like part, pushing the area, while being elastically deformed, radially inwards in relation to the longitudinal axis by means of a tool element so that the tube-like part is stretched by an amount delta L by which the tube-like part is shortened because of a formation of the area which is enlarged in diameter, and flanging the edge of the tube-like part while the tube-like part is stretched.

7 Claims, 4 Drawing Sheets

METHOD OF PRODUCING CONNECTION OF INSERT WITH TUBULAR PART BY FLANGING

BACKGROUND OF THE INVENTION

The invention relates to a method for producing a connection between an insert element with a tube-like part by means of flanging.

Such a method is known, for example, from DE 40 13 032 A1. With this method the insert element is embodied as a lid, which is introduced from a front end of a tube-like part embodied as a housing. The lid comes to rest in the direction of the longitudinal axis of the housing against a detent in order to assure exact positioning in the direction of the longitudinal axis. Subsequently the edge of the housing which projects past the lid in the direction of the longitudinal axis is flanged radially inward in relation to the longitudinal axis of the housing, while being plastically deformed, so that it grips around the outer edge of the lid and rests against the lid in the direction of the longitudinal axis of the housing. The lid is then fixed in place between the detent and the flanged edge of the housing in the direction of the longitudinal axis. During flanging of the edge of the housing, the housing is pressed together in the direction of its longitudinal axis and after flanging springs back. The holding power of the flange is reduced and, under unfavorable circumstances can even become zero.

A method is furthermore known in which the maintenance of the holding power of the flange is assured. To this end the tube-like part has an area whose exterior diameter is enlarged in respect to the remaining area over at least a portion of its circumference at its one end, into which the insert element is to be introduced. To produce the flange, a ring-shaped tool element is pushed over the tube-like part from its other end, whose cross section is less than the area of the tube-like part of enlarged exterior cross section and is at least as large as the exterior cross section of the remainder of the tube-like part. A relative movement in the direction of the longitudinal axis takes place between the tool element and the tube-like part, so that the tool element is moved over the area of the tube-like part with the enlarged exterior cross section and this area is pushed radially inward in relation to the longitudinal axis while being plastically deformed. While the ring-shaped tool element is moved over the area of the tube-like part with an enlarged exterior cross section, a tensile force simultaneously acts on the tube-like part, so that the holding power on the insert element is even increased by the spring-back of the tube-like part following the production of the flange, and in this way an assured fastening of the insert element in the tube-like part is achieved.

The area which has an enlarged exterior cross section in relation to its remaining area, which is formed on the one end in which the pump element is inserted, requires several work steps for its production, for example by deep drawing.

SUMMARY OF THE INVENTION

In contrast to this, the method in accordance with the invention for producing a connection between an insert element with a tube-like part by means of flanging, has the advantage that an area of enlarged diameter is provided on the tube-like part which, during the flanging process, is elastically deformed by a tool element which receives the tube-like part, so that the free end of the tube-like part is stretched by this, because of which, following the flanging process, the spring-back of the elastic area of the tube-like part can be compensated, and the insert element is maintained in the tube-like part under at least partial tension, and secure fastening can be achieved.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
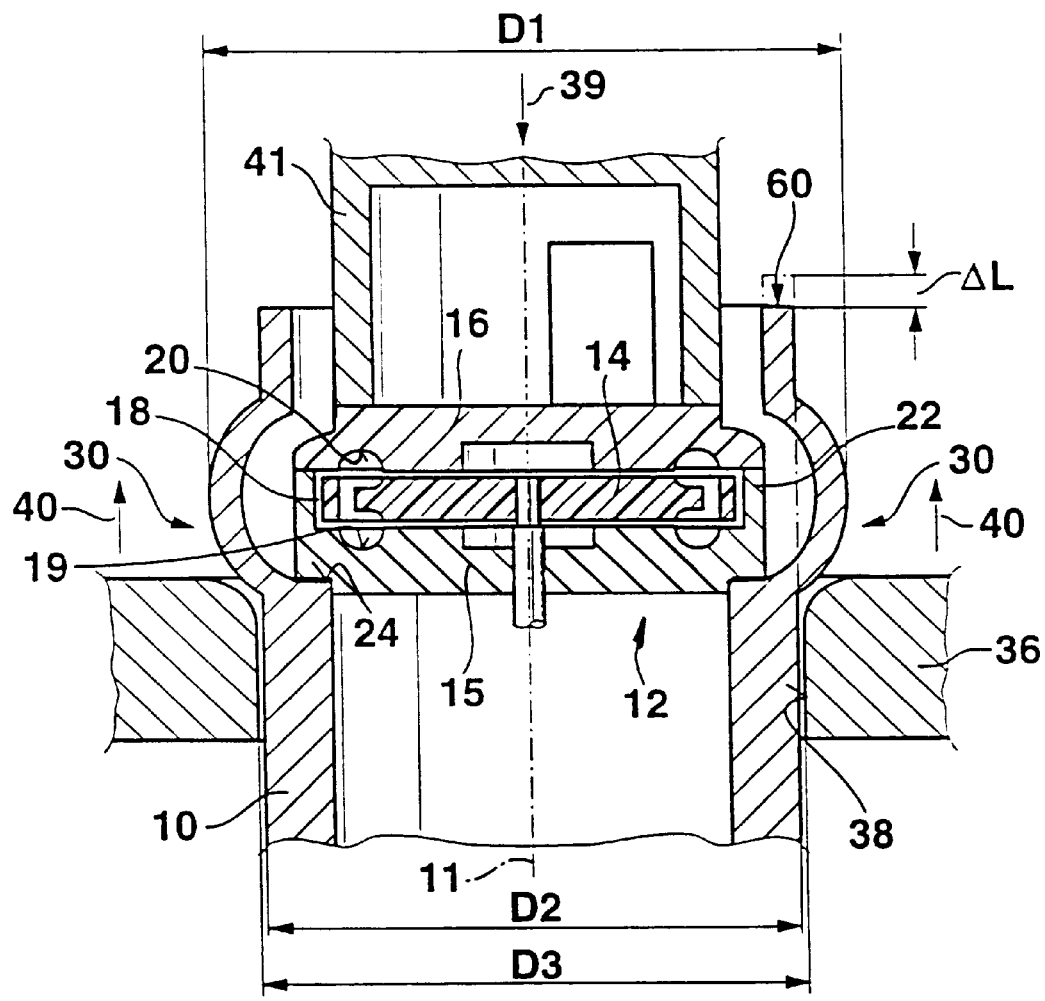
FIG. 1, an insert element and a tube-like part during a first phase of producing a flanged connection by means of a tool element, FIG. 2, a tube-like part clamped in a tool element after spring-back of the finished flange, FIG. 3, a flanged connection at the end of the method in accordance with the invention, and FIG. 4, a further embodiment for producing the flanged connection in accordance with the invention with a two-part tube-like part.

A unit represented in FIGS. 1 to 4 has a tube-like part 10 and an insert element 12 disposed inside it. The unit is a fuel conveying unit for supplying an internal combustion engine of a motor vehicle with fuel. The tube-like part 10 in this case is a housing and the insert element 12 is a pump element which is inserted into the housing 10 from the direction of a front end.

An electrical drive motor is placed into the housing 10 in addition to the pump element 12. The pump element 12 is embodied as a flow pump element and has an impeller wheel 14, which is arranged in a pump chamber 18, which is delimited in the direction of the longitudinal axis 11 of the housing 10 by two wall elements 15 and 16. On their front ends facing the impeller wheel 14, the wall elements 15 and 16 respectively have a ring-shaped conveying conduit 19 and 20, which is arranged on the same diameter as the vanes of the impeller wheel 14. A space for receiving the impeller wheel 14 with a defined axial play in the pump chamber 18 is provided between the two wall elements 15 and 16 in the direction of the longitudinal axis 11 of the housing 10. The inner wall element 15 has a cylindrical shoulder 22, which delimits the pump chamber 18 in the radial direction in relation to the longitudinal axis 11 and against whose front the outer wall element 16 rests.

Figure 4:
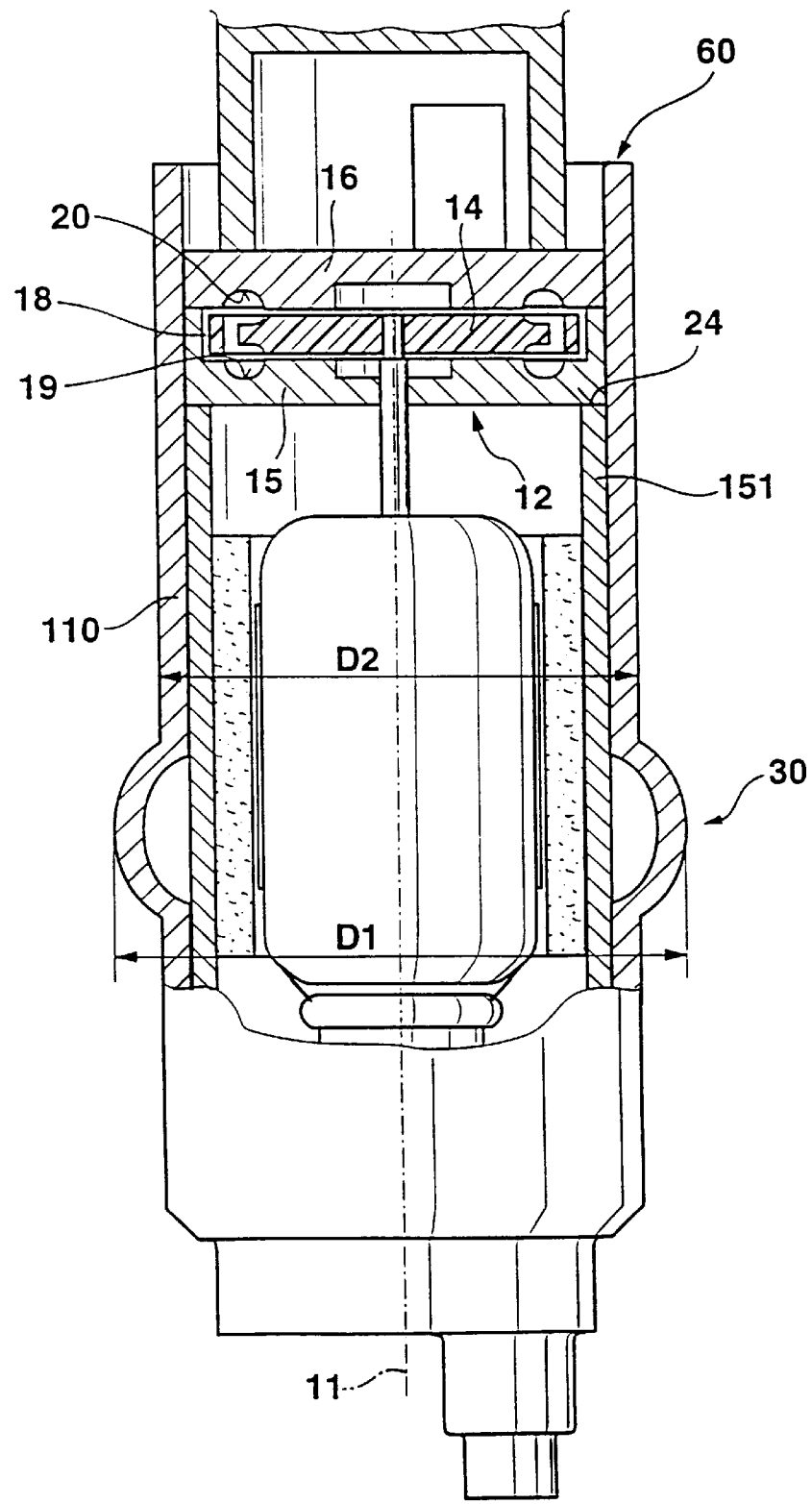

In its end area where the pump element 12 is disposed, the housing 10 has a greater diameter as in the remaining area, so that at the transition between the greater diameter and the lesser diameter a step 24 is formed, which is disposed radially in relation to the longitudinal axis of the housing 12 and points in the direction toward the front end of the housing 10. The step 24 forms a detent, against which the pump element 12 comes to rest via the inner wall element 15 in the direction of the longitudinal axis. An axial detent 24 for the pump element 12 can also be constituted by a further component disposed in the housing 10 (FIG. 4).

The housing 10 is embodied with a circular cross section and has in the area of its one end, in which the pump element 12 is inserted, an area 30 with a diameter which is enlarged in respect to its remaining area, in particular an enlarged exterior diameter. The exterior diameter of the housing 10 is identified by D1 in the area 30, and the exterior diameter of the housing 10 in the remaining area adjoining the area 30 is identified by D2. The area 30 extends over the entire circumference of the housing 10 and forms a circular bead, which has an even curvature in its area 30 and is embodied to be sickle-shaped or semicircular. The embodiment of the circular bead can be provided by known methods of production technology. The housing 10 is made of a material which is at least elastically deformable, in particular of metal, and can be produced by deep drawing, for example.

Because of forming the area 30 which is enlarged in diameter, the entire length of the housing is shortened by the amount Delta L. The amount by which the external diameter D1 of the enlarged area 30 is increased in relation to the exterior diameter D2 determines the amount Delta L, by which the total length of the housing 10 is shortened. As will be explained further below, this amount Delta L determines the holding or tension force with which the insert element 12 is held against the detent 24 in the housing 10.

In FIG. 1 the housing is represented with the pump element 12 inserted in it and before the pump element 12 is fastened. From the end of the housing 10 located opposite the area 30 which is enlarged in diameter, a ring-shaped tool element 36 is pushed over the housing and has an opening 38, whose diameter D3 is only slightly greater than the diameter D2 of the housing 10 in the area outside the area 30 which is enlarged in diameter, so that the tool element 36 can be displaced without catching on the housing 10 up to the area 30.

The tool element 36 can be disposed fixed in place as a part of a device, wherein the housing 10 is then inserted into its opening 38 in the direction of the arrow 39 in FIG. 1, or the housing 10 can be clamped into a device and the tool element 36 is then pushed on the housing 10 in the direction of the arrows 40 in FIG. 1.

Alternatively the tool element 36 can be embodied as a segment-like ring, which is positioned in respect to the enlarged area 30 in its position of rest, in which it is spread open. This segment-like ring can be changed into a clamping or work state, wherein the segment-like ring compresses the enlarged area. It is therefore possible to insert the enlarged area 30 freely into the processing position in respect to the tool element 36.

On its edge pointing toward the area 30 which is enlarged in diameter, the opening 38 of the tool element 36 increases from the diameter D3 and is rounded, but can also be embodied to be conically widened from the diameter D3, for example.

By means of a restraint 41 acting on the outer wall element 16 of the pump element 12, the inner wall element 15 of the latter is kept in contact with the step 24. Subsequently, a relative movement in the direction of the longitudinal axis 11 is caused between the housing 10 and the tool element 36 in that either the housing 10 is moved relative to the fixed tool element 36, or the tool element 36 is moved relative to the fixed housing 10. In the process the tool element 36 slides on the area 30 which is enlarged in diameter, which is made easier because of the rounded or inclined edge of the opening 38 of the tool element 36 and the inclined or rounded rise or insertion incline of the area 30 which is enlarged in diameter. In the process the area 30 is pushed radially inward in respect to the longitudinal axis 11 by the tool element 36, while being elastically deformed, as represented in FIG. 2, and rests with its inner surface against the outer surface of the pump element 12.

Because of the elastic deformation of the area 30 which is enlarged in diameter, the housing 10 is stretched to its original length in the direction of the longitudinal axis 11 and maintained in this position. The shortening by the amount Delta L of the entire length of the housing 10 is at least partially cancelled, wherein the original length of the housing 10 can be achieved if the diameter D3 of the opening 38 of the tool element 36 essentially corresponds to the exterior diameter D2 of the housing 10.

Figure 2:
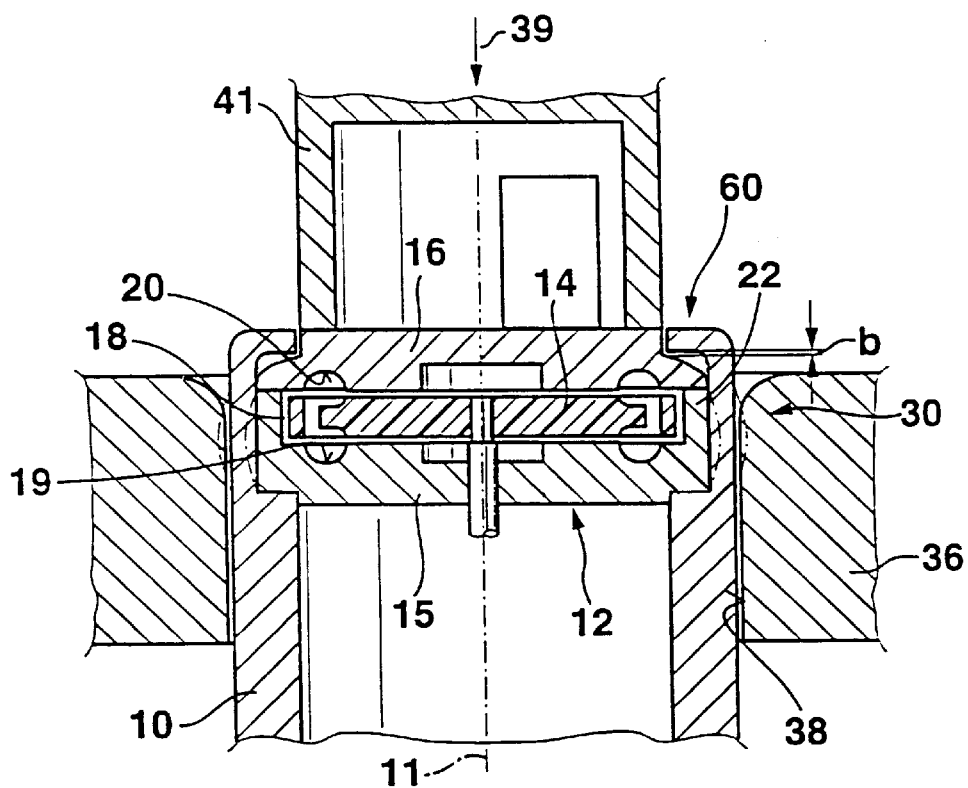
Figure 3:
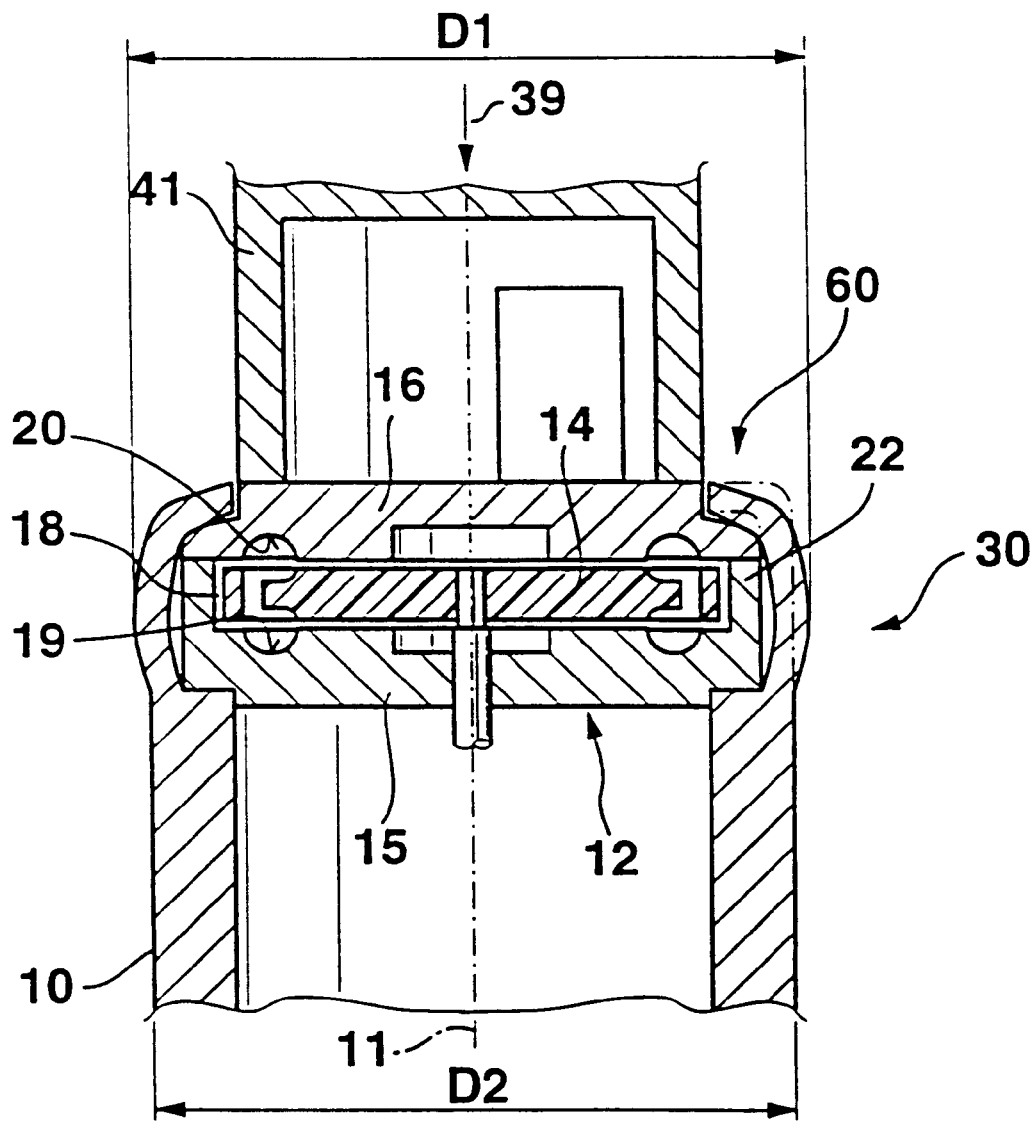

In the arrangement of the tool element 36 in respect to the housing 10 represented in FIG. 2, the flanging of the one end 60, into which the pump element 12 is inserted, is performed with a conventional flanging tool. In the process the inner wall element 15 of the pump element 12 is maintained in contact with the step 24 by means of a restraint 41, which acts on its outer wall element 16. Following the end of the flanging process and the reduction of the flanging pressure, the housing 10 springs partially back, i.e. the flanged free end 60 of the housing 10 springs back a little by the amount b following flanging, because of which normally the holding power of the flange is reduced.

After the flange has been made, if the housing 10 has been arranged in a fixed tool element 36, it is moved out of the tool element 36 opposite the direction of the arrow 39. Alternatively, the housing 10, which is clamped in the device and the tool element 36 had previously been pushed on the item 10 in the direction of the arrows 40, is taken off opposite the direction of the arrows 40. Because of the elastic deformation of the area 30, which is enlarged in diameter, by the tool element 36 which is clamped around it during the flanging process, a reshaping of the area 30 which is enlarged in diameter to its original shaped takes place. This causes a shortening of the housing 10 by the amount Delta L, which compensates the spring-back of the flange by the amount b and fixes, at least under a low tension, the pump element 12 on the detent 24. Because of this at least the holding power of the flange can be maintained and a secure fastening of the pump element 12 in the housing 10 can be achieved.

The area 30 which is enlarged in diameter preferably has a diameter D1, which has a shortening of the total length of the housing 10 by the amount Delta L which, following the reshaping of the area 30 into its original shape, fixes the pump element 12 under tension in respect to the housing, so that the holding force on the insert element is even increased.

A variant of the housing 110 is represented in FIG. 4. The housing 10 has a constant wall thickness over its entire length. In its end section, in which the pump element 12 is inserted and arranged, by a tube 151 arranged in the housing 10, a transition from the greater diameter of the housing to the lesser diameter of the tube 10, and step 24 oriented toward the front end of the housing 10 and disposed radially with the longitudinal axis 11 of the housing 10 are formed. The pump element 12 comes to rest over the inner wall element 15 in the direction of the longitudinal axis 11 against this step 24, which forms a detent and is constituted by the housing 110 and the tube 151.

This alternative embodiment has the advantage, that the area 30 which is enlarged in diameter can be selectively arranged over the entire length of the housing 10.

The tube 151 arranged in the housing 110 is loosely disposed in the housing 110 in the method steps described in FIG. 1 and FIG. 2. Because of this, as well as the elastic deformation of the area 30 which is enlarged in diameter from its diameter D1 to the diameter D3, stretching of the housing 10 can take place, since the housing 10 is not directly tied to the detent 24 and is not fixed in place in this position in relation to the free end 60. After the flanging process has been terminated and the housing 110 has been taken out of the tool element 36, the enlarged area 30, which is held under tension, springs back to its original diameter D1, wherein the total length of the housing 110 is again shortened by the amount Delta L. At this time the tube 151 is disposed in the housing 110 so it cannot be displaced, wherein the pump element 12 rests under tension against the detent formed by the tube 151 because of the clamping force applied by flange.

Alternatively it can be provided that the housing 10, 110 has two or more areas 30 which are enlarged in diameter. Furthermore, the enlarged area 30 can have an insertion incline or a flatly rising edge zone at least in the direction of the arrow 39, so that the insertion of the housing 10, 110 into the opening 38 of the tool element 36 is made easier. The section of the area 30 which is enlarged in diameter and situated opposite this insertion incline can be embodied to be steeper, so that it is not necessary for the circular bead to have a constant course.

What is claimed is:

1. A method of producing a connection between an insert element and a tubular part by means of flanging, the method comprising the steps of: forming in the tubular part an area which is enlarged in diameter over at least a part of a circumference of the tubular part, is spaced from axial ends of the tubular part, and has an axial length substantially corresponding to an axial size of the insert element; inserting the insert element into the tubular part until the insert element comes to rest against a detent formed on the tubular part adjacent an axial end portion of the enlarged area, so that the insert element is positioned adjacent an edge of one axial end of the tubular part and a space is provided between the insert element and the enlarged area of the tubular part in a radial direction in relation to the longitudinal axis of the tubular part; pushing the enlarged area radially inwards in relation to the longitudinal axis by means of a tool element to elastically deform the area so that the tubular part is longitudinally stretched without deformation of the insert element; and flanging the edge of the tubular part radially inwardly in relation to the longitudinal axis while the tubular part is stretched, so as to fix the insert element in place in the direction of the longitudinal axis between the detent and the edge of the tubular part.

2. The method as defined in claim 1, wherein the tool element is ring-shaped, and the pushing step is performed by sliding the tool element over the enlarged area.

3. The method as defined in claim 1, further comprising, after the flanging step, removing the tool element from the tubular part so that the area which is elastically deformed springs back to an initial state, thereby compensating for spring back of the flanged edge of the tubular part.

4. The method as defined in claim 3, further comprising selecting the diameter of the enlarged area of the tubular part such that after flanging of the tubular part, the insert element is fixed in place against the detent at least under slight tension.

5. The method as defined in claim 1, wherein the enlarged area is formed as a circular bead.

6. The method as defined in claim 5, wherein the tool element comprises a plurality of segments which together define a ring, and the pushing step is performed by moving the segments radially inwardly from an open, insertion position in which they are spaced from the circular bead to a closed, clamping position in which the segments compress and elastically deform the circular bead.

7. A method of producing a connection between an insert element and a tubular part by means of flanging, the method comprising the steps of: forming in the tubular part an enlarged diameter circular bead which is spaced from axial ends of the tubular part and has an axial length substantially corresponding to an axial size of the insert element; inserting the insert element into the tubular part until the insert element comes to rest against a detent axially spaced from the circular bead, so that the insert element is positioned adjacent an edge of one axial end of the tubular part; pushing the circular bead radially inwards in relation to the longitudinal axis of the tubular part by means of a tool element to elastically deform the circular bead so that the tubular part is longitudinally stretched without deformation of the insert element; and flanging the edge of the tubular part radially inwardly in relation to the longitudinal axis while the tubular part is stretched, so as to fix the insert element in place in the direction of the longitudinal axis between the detent and the edge of the tubular part.

* * * * *